(12) United States Patent
Sobczak

(10) Patent No.: US 7,589,860 B2
(45) Date of Patent: Sep. 15, 2009

(54) METHOD, APPARATUS AND COMPUTER PROGRAM PRODUCT FOR PROCESSING IMAGE DATA STORED ON A MEMORY FOR RENDERING AN IMAGE ON A DEVICE

(75) Inventor: Phillipe Sobczak, Cachan (FR)

(73) Assignee: Oce-Technologies B.V., Venlo (NL)

( * ) Notice: Subject to any disclaimer, the term of this patent is extended or adjusted under 35 U.S.C. 154(b) by 621 days.

(21) Appl. No.: 11/210,796

(22) Filed: Aug. 25, 2005

(65) Prior Publication Data

US 2006/0044584 A1 Mar. 2, 2006

(30) Foreign Application Priority Data

Aug. 26, 2004 (EP) .................................. 04292091

(51) Int. Cl.
*G06K 15/00* (2006.01)

(52) U.S. Cl. ..................... 358/1.16; 358/1.2; 358/3.06

(58) Field of Classification Search .................. 358/1.1, 358/1.2, 3.06, 1.16, 1.17; 382/296, 297, 382/298
See application file for complete search history.

(56) References Cited

U.S. PATENT DOCUMENTS

| | | | |
|---|---|---|---|
| 4,658,430 A | 4/1987 | Anderson et al. | |
| 4,935,821 A * | 6/1990 | Sano et al. | 358/401 |
| 5,065,446 A * | 11/1991 | Suzuki et al. | 382/253 |
| 5,594,860 A | 1/1997 | Gauthier | |
| 6,115,134 A * | 9/2000 | Creel et al. | 358/1.16 |
| 2002/0191865 A1 | 12/2002 | Yamaguchi et al. | |

FOREIGN PATENT DOCUMENTS

| | | |
|---|---|---|
| EP | 0 764 918 A2 | 3/1997 |
| JP | 0 921 493 A2 | 6/1999 |

* cited by examiner

*Primary Examiner*—Thomas D Lee
(74) *Attorney, Agent, or Firm*—Birch, Stewart, Kolasch & Birch, LLP

(57) ABSTRACT

The invention relates to a method and an apparatus for processing image data stored on a memory for rendering an image on a device. The method comprises dividing the image data into a number of portions of image data, each portion consisting of a number of untruncated data lines; applying to each portion of image data a rasterizing algorithm comprising: a. writing the portion of image data to a RAM, b. halftoning said portion of image data for obtaining a portion of rasterized image data, and c. writing the portion of rasterized image data to a mass memory; assembling the portions of rasterized image data on the mass memory for obtaining rasterized image data; dividing the rasterized image data into a number of blocks; and applying a transformation algorithm to each block of rasterized image data for obtaining blocks of processed image data.

15 Claims, 4 Drawing Sheets

METHOD, APPARATUS AND COMPUTER PROGRAM PRODUCT FOR PROCESSING IMAGE DATA STORED ON A MEMORY FOR RENDERING AN IMAGE ON A DEVICE

This application claims the priority benefit of the European Patent Application No. 04292091.8 filed in on Aug. 26, 2004, which is hereby incorporated by reference.

BACKGROUND OF THE INVENTION

1. Field of the Invention

The invention relates to a method of processing image data stored on a memory for rendering an image on a device. The invention relates more particularly to a method of processing image data for printing an image on a print engine or for viewing an image on a display device. The invention relates further to a method of processing image data comprising transformation of the image such as rotation or symmetry operation (mirroring).

2. Discussion of the Related Art

A method of processing image data stored on a memory for rendering an image on a device is known. In particular, a method is known for rotating and rasterizing image data for printing purposes. The image data representing the image to be printed is written onto a Random Access Memory (RAM) and is divided into a number of blocks. The data within each block is rotated and the location of each of the block in the memory is rotated with respect to the original image. The rotated image data is then rasterized and transmitted to a print engine. With the known method, however, difficulties are encountered when the image to be processed is having a file size larger than the RAM space allocated for storing image data. Even when the image data is divided into portions for processing, the portions having a size inferior to the RAM space allocated for storing image data, problems remain. For example, after rotation of a portion, it may happen that that the rotated image data portion comprises truncated data lines. It makes advance image processing, such as halftoning by error diffusion dither or scaling by area mapping, cumbersome.

SUMMARY OF THE INVENTION

Accordingly, the present invention provides a method, apparatus and computer program for processing image data stored on a memory, which overcome the limitations and disadvantages associated with the related art.

The present invention seeks to provide a method of processing image data stored on a memory for rendering an image on a device particularly suited for image data with a file size larger than the RAM space allocated for storing image data.

The method according to an aspect of the invention comprises the steps of: dividing the image data into a number of portions of image data, each portion consisting of a number of untruncated data lines; applying to each portion of image data a rasterizing algorithm comprising: (a) writing the portion of image data to a RAM, (b) halftoning the portion of image data for obtaining a portion of rasterized image data, and (c) writing the portion of rasterized image data to a mass memory; assembling the portions of rasterized image data on the mass memory for obtaining rasterized image data; dividing the rasterized image data into a number of blocks; and applying a transformation algorithm to each block of rasterized image data for obtaining blocks of processed image data.

The transformation algorithm is applied to blocks of rasterized image data, which makes the processing of image data according to the invention more convenient than the related art. In particular, the rasterizing algorithm is applied to portions of original data, each portion consisting of a number of untruncated data lines, making the use of advance image processing, such as halftoning by error diffusion dither or scaling by area mapping, convenient.

Furthermore, the method according to the invention is more efficient than the related art method. For example, if the original image data is a grey scale image coded with 8 bits per pixel, processing the image data is faster with the method according to the invention than with the related art method. This is because in the first case, the transformation (rotation for example) is performed on rasterized image data being coded with 1 bit per pixel, while in the second case, the transformation (rotation for example) is performed on the original data (8 bits per pixel).

According to a method known from U.S. patent application Publication No. US 2002/0191865 A1, images are manipulated by processing blocks of the image and are printed on a plot unit. Manipulation of the image blocks includes image rotation, performing logical function such as ANDing or ORing, and generating an image by repeatedly using all or part of another image. The plot unit may be capable of generating a rasterized image. Alternatively, image data may be transmitted to the plot unit in a rasterized format. However, it is not known from this document to divide the image data into a number of portions of image data, each portion consisting of a number of untruncated data lines, to apply to each portion of image data a rasterizing algorithm comprising:

a. writing the portion of image data from the memory to a RAM;
b. halftoning said portion of image data for obtaining a portion of rasterized image data;
c. writing the portion of rasterized image data to a mass memory;

to assemble the portions of rasterized image data on the mass memory for obtaining rasterized image data, to divide the rasterized image data into a number of blocks and to apply a transformation algorithm to each block of rasterized image data for obtaining blocks of processed image data, as is done in the present invention.

In one embodiment of the invention, the rasterizing algorithm further comprises the step of scaling the portion of image data. It is particularly convenient to apply the step of scaling (for example, area mapping scaling) to a portion of image data consisting of a number of untruncated data lines. It also allows a reduction of the time needed for data processing compared to known methods.

Preferably, according to an embodiment of the present invention, image data compression is applied to each portion of rasterized image data. More space can thus be made available on the mass memory.

According to an embodiment of the present invention, the transformation algorithm may comprise a rotation applied to the blocks of rasterized image data. The transformation algorithm may also comprise a symmetry operation applied to the blocks of rasterized image data.

The invention particularly provides a method of processing image data wherein the blocks of rasterized image data are successively read out of the mass memory, transformed into blocks of processed image data and transferred to the device according to a sequence being the same as the sequence in which the blocks of processed image data are to be rendered on the device. This a very efficient way of processing the blocks of rasterized image data for printing or viewing purposes, for example. Printing or viewing the blocks of processed image data can thus start before all blocks of rasterized image data have been processed.

The invention also relates to an apparatus for processing image data stored on a memory for rendering an image on a device. The invention provides such an apparatus comprising a RAM, a mass memory, a module for dividing the image data into a number of portions of image data, each portion consisting of a number of untruncated data lines, a raster image processor unit for applying a rasterization algorithm to each block of image data, executing the steps of:

a. writing a portion of image data to the RAM;
b. halftoning the portion of image data for obtaining a portion of rasterized image data;
c. writing the portion of rasterized image data to the mass memory;

a module for assembling the portions of rasterized image data on the mass memory for obtaining rasterized image data, a module for dividing the rasterized image data into a number of blocks, and a conversion module for transforming each block of rasterized image data into a block of processed image data.

The invention also provides an apparatus further comprising a print engine and a module for transferring the blocks of processed image data to the print engine.

The invention also provides an apparatus further comprising a display device and a module for transferring the blocks of processed image data to the display device.

The invention also provides a computer program product residing on a computer readable medium comprising computer-executable instructions (codes) for causing at least one process unit to perform the steps of the method(s) of the invention.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Preferred embodiments of the present invention are now explained with reference to the drawings.

DETAILED DESCRIPTION OF THE PREFERRED EMBODIMENTS

Figure 1A:
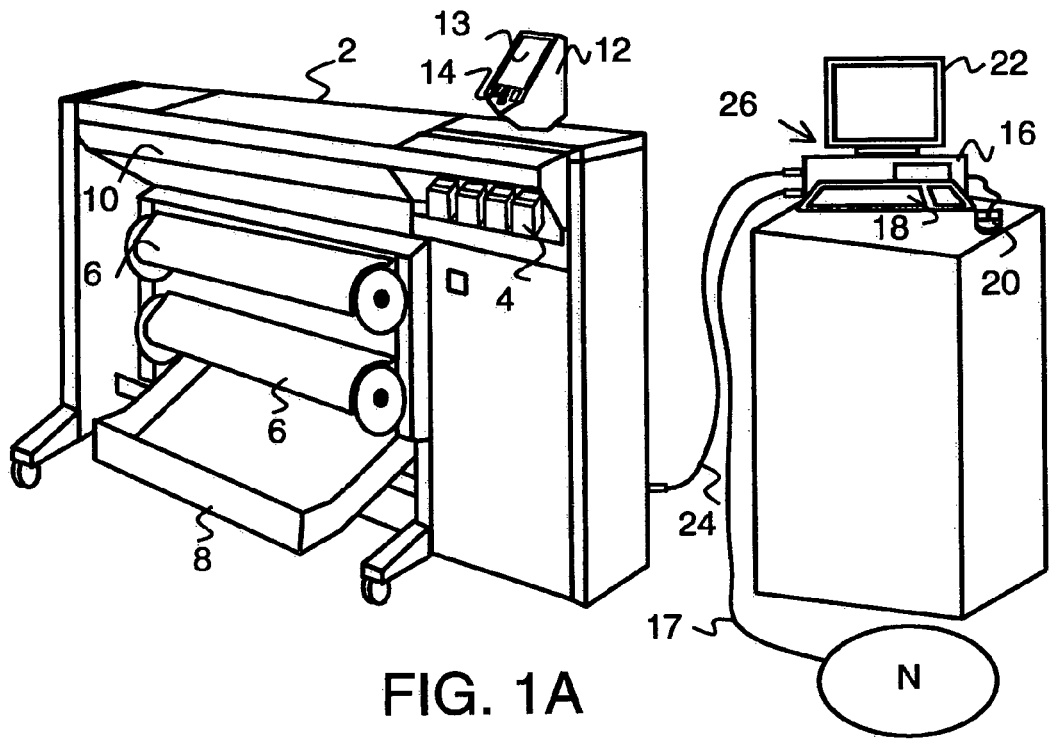
FIG. 1A is a schematic diagram of a print server connected to a print engine for processing and printing an image according to an embodiment of the invention.

Processing and rendering an image according to the invention can be performed in an apparatus as shown in FIG. 1A.

Figure 2:
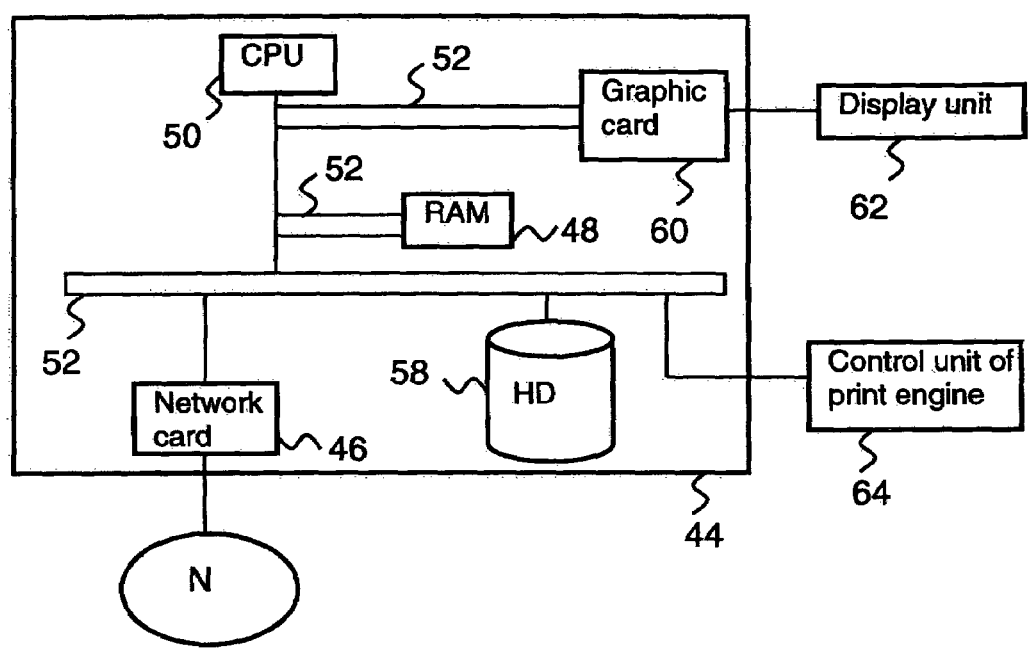
FIG. 2 is component diagram of an apparatus for processing image data according to an embodiment of the invention.

Referring to FIG. 1A, a print engine (printer) 2 is connected to a print server 26 suited for sending print jobs to the print engine 2 through a connection cable 24. All the components of FIG. 1A are operatively coupled. The print server 26 is further connected to a network N, the connection being diagrammatically shown in the form of a cable 17. N may be a local area network that enables a number of users logged on client computers sending print jobs to the printer 2, or may represent the internet. The print server 26 receives print jobs from the client computers, converts them in a format that can be processed by the print engine 2 and ensures in co-operation with a control unit (64 in FIG. 2) placed inside the print engine 2 that the digital images sent with the print jobs are printed on image supports. For performing these tasks, the printer server 26 is provided with a controller 44 of which the essential parts are shown in FIG. 2, and others such as a screen 22, a processor 16, a keyboard 18 and a mouse 20.

The print engine 2 can use any number of printing techniques. It can be a thermal or piezoelectric inkjet printer, a pen plotter, or a press system based on organic photoconductor technology, for instance. In the example shown in FIG. 1A, printing is achieved using a wide format inkjet printer provided with four different basic inks, such as cyan, magenta, yellow and black. The basic inks are stored in four ink containers 4 for supplying ink to the ink jet printhead shown in FIG. 1B. The images are printed on an ink receiving medium such as a sheet of paper supplied by any of the paper rolls 6. Printed sheets of papers are deposited in the delivery tray 8. The user interface panel 12 is provided with a display screen 13 and a key panel 14. The user interface panel 12 is connected to the control unit 64 inside the print engine and to the print server 26. The key panel 14 includes a contact lock for switching on and off the print engine and other input means such as buttons for selecting a user, setting queuing parameters etc. The housing 10 contains the printhead which is mounted on a carriage for printing swaths of images.

Figure 1B:
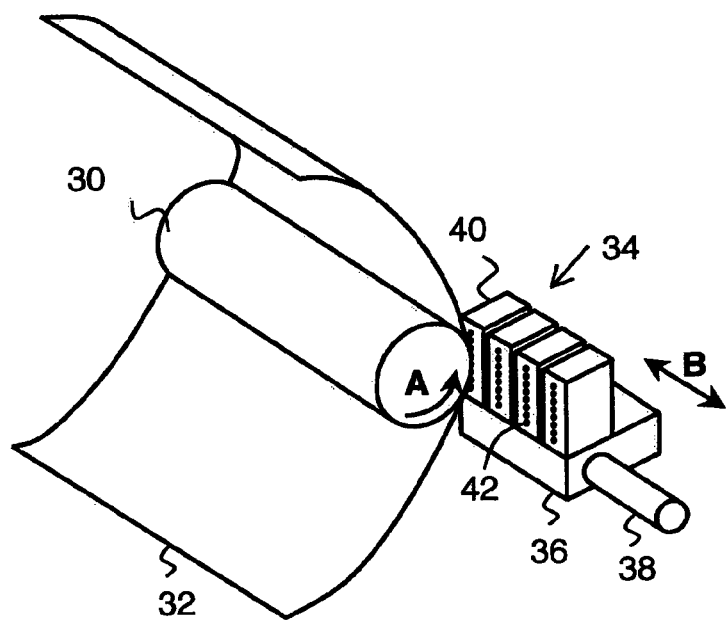
FIG. 1B is a schematic diagram of the printing parts of a print engine.

FIG. 1B shows printing parts of an ink jet printer which can be the print engine 2. As shown in FIG. 1B, the ink jet printer comprises a platen 30 driven for rotation in the direction of an arrow A for transporting a paper sheet 32 which serves as an image recording medium. A printhead 34 is mounted on a carriage 36 which is guided on guide rails 38 and travels back and forth in the direction of an arrow B along the platen 30 so as to scan the paper sheet 32. The printhead 34 comprises four nozzle heads 40, one for each of the basic colours yellow, magenta, cyan and black. An ink is supplied to a nozzle head 40 from an ink container through a pipe. On the side facing the sheet 32, each nozzle head 40 has a linear array of nozzles 42. The nozzle heads 40 are energised in accordance with image information of an image to be printed on the sheet 32. Signals are transmitted to the printhead 34 through a connector mounted on the carriage 36. Signals in accordance with print data arise from a control unit connected to the printhead 34 through a connector. Each nozzle 42 can be energised separately so as to eject an ink droplet which will form a dot at a corresponding pixel position on the sheet 32. Thus, when the printhead 34 performs a single stroke along the platen 30, each nozzle 42 can be energised to draw a single pixel line of the intended image. As a result, during each forward or backward stroke of the carriage 36, the printhead 34 will print a swath or band of the image, and the number of pixels lines of the swath will correspond to the number of nozzles 42 present in each nozzle array. Although only eight nozzles 42 are shown per nozzle head 40 in FIG. 1B, in practice, the number of nozzles is considerably larger.

When a user wants to print a digital document stored on a workstation connected to the network N, for example an engineering drawing having the format HP-GL/2, he or she calls up a client application by clicking an icon intended for this purpose in the application window of his monitor. The user selects the print engine on which the document is to be printed, for example the print engine 2. The data file of the document to be printed is thus transferred through the network N to the print server 26 connected to the print engine 2. For sending the file, an http network communication may be used. The print server 26 is provided with a controller 44 (FIG. 2) comprising a Central Processing Unit (CPU) 50, a Random Access Memory (RAM) 48, a graphic card 60, a network card 46 and a hard disk 58. Data are sent and received within the controller 44 through a bus system 52. The controller 44 of the print server 26 receives the data file of the document to be printed from the network N through the network card 46. The file is then written onto the mass memory (hard disk 58). The controller 44 communicates with the control unit 64 of the print engine 2 and with a display unit 62 which can be the display screen 13 of the print engine 2.

Figure 3:
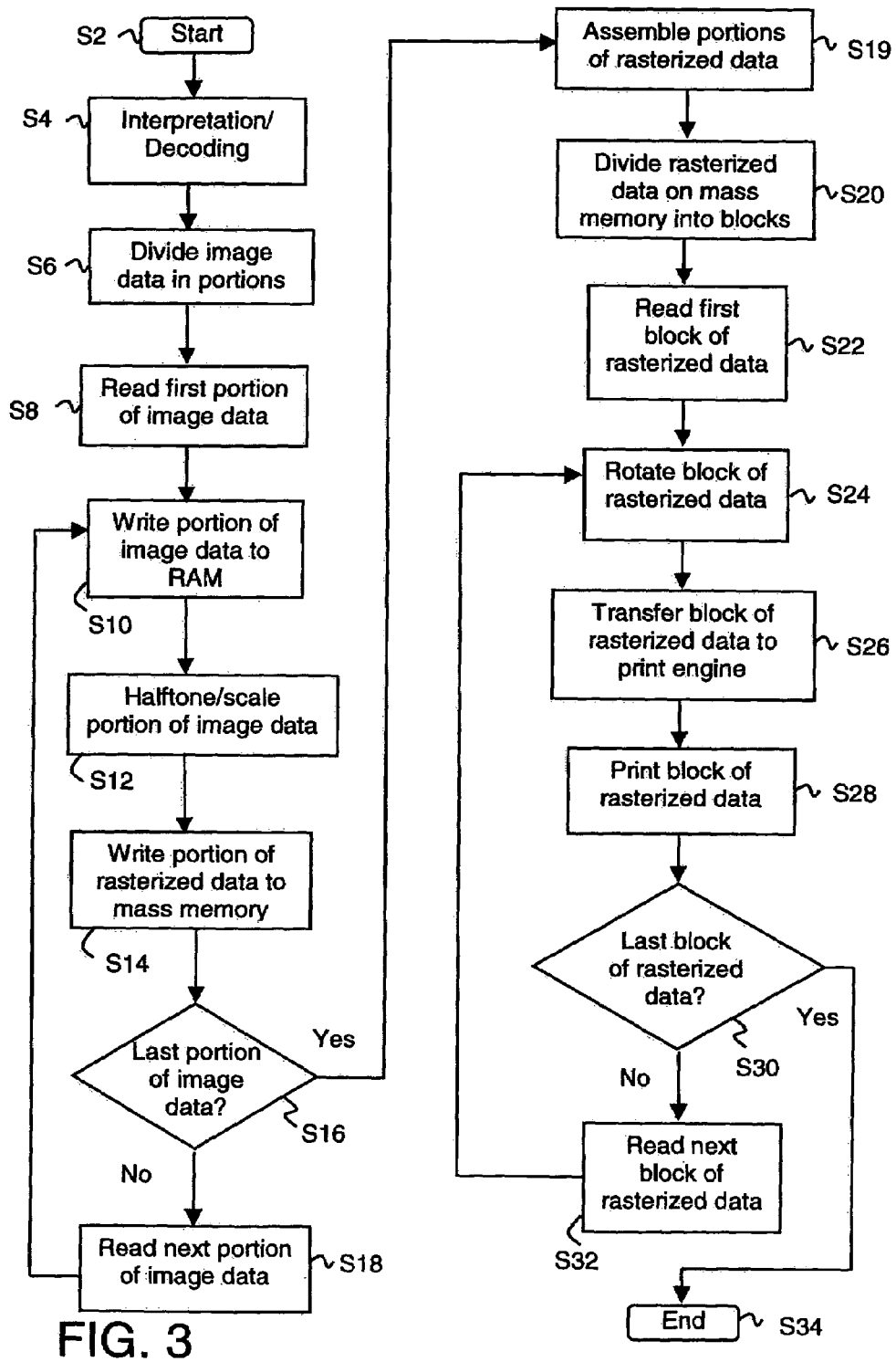
FIG. 3 is a flow diagram showing a method according to an embodiment of the invention.

FIG. 3 is a flow diagram showing a method according to an embodiment of the invention. This method is implemented in the system of FIGS. 1A-2, or in other suitable device or system. In step S2, a program, stored for example on the hard disk 58, is started. This program comprises instructions (codes) which are executed by the CPU 50. In step S4, the document file is interpreted and decoded in order to obtain image data in a format suited for the operations that follow. The interpretation and decoding are executed by the CPU 50, the interpretation function (interpreter) being defined in a computer program stored on the hard disk 58. The interpreter examines the data of the document file and identifies the command embedded in the data, such as printer control, page format, font management, text layout and graphics. The decoder creates image data (graphic primitives) representing the document to be printed. A well suited format for the image data is TIFF (Tagged Image File Format), which may contain tiles or multiple bands and whereby the colours may be defined in a colour space having three colour planes, each pixel being represented by 24 bits (8 bits for each colour plane).

Figure 4A:
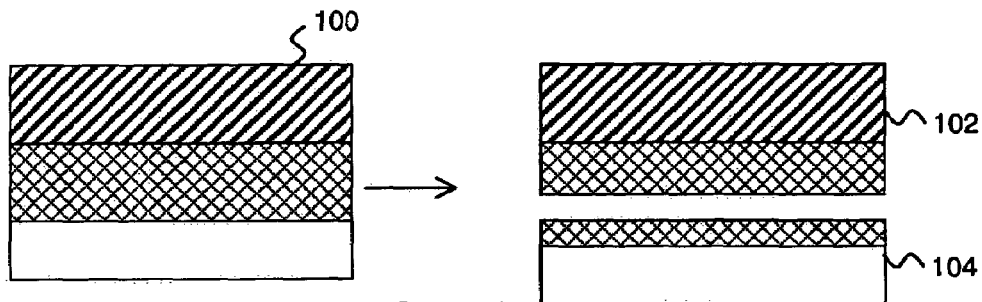
FIGS. 4A to 4D illustrate a scaling and a halftoning operation followed by a rotation of 90 degrees of an image to be printed according to an embodiment of the invention.

In step S6, the TIFF image data, representing the document to be printed, is divided into portions. This step is illustrated in FIG. 4A. The image data 100, being in the example a TIFF image having a data size reaching NO, is divided into two portions, a first portion 102 having a data size N2 and a second portion 104 having a data size N4. Each portion contains a plurality of TIFF bands.

The processor 50 of the controller 44 calls a function for reading the first portion 102 of the image data (step S8), and for writing the portion 102 to the RAM 48 of the controller (S10). The portion 102 contains solely data lines that are untruncated. In the example, each portion contains a number of TIFF bands, ensuring that each one of the data lines is untruncated. The size N2 of the portion 102 is such that N2 is equal to N or smaller than N, N being the size of the space allocated on the RAM 48 for storing image data.

In step S12, a Raster Image Processing (RIP) algorithm is applied to the portion 102 of image data being stored on the RAM 48. The RIP algorithm is embedded in a program stored on the hard disk 58 and executed by the CPU 50. In particular, the TIFF data of the portion 102 is halftoned by the RIP algorithm. Digital halftoning is the process of converting an image containing many different levels of grey or colour into a representation that is suitable for display or printing on a device that only supports a few different grey or colour levels. In so-called binary printers, only two possible energy levels can be applied to an image forming element (for example, the nozzle of an ink jet printer), one level '1' for giving rise to dot, the other level '0' corresponding to the absence of dot. The portion of image data (TIFF) is processed into a binary data, one layer being obtained for each process colours, for example C, M, Y, K. This is done by the RIP algorithm according to well-known halftoning techniques. For example, error diffusion dither can be used. The data obtained after the application of the RIP algorithm is thus halftoned image data.

Figure 4B:
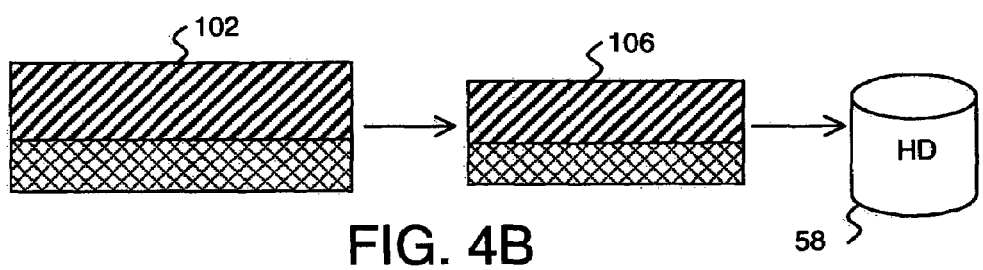

Another transformation that may be applied to the portion of data 102 (on the RAM) is scaling, as illustrated in FIG. 4B. A possible algorithm used for the scaling operation is area mapping scaling. Halftoning and scaling transformations are applied by the RIP algorithm on the data of the portion 102, resulting in a portion of data 106. In step S14, the portion of rasterized image data 106 is written to the hard disk 58. The memory space in the RAM 48 allocated for image data is made free for performing the next tasks.

Figure 4C:
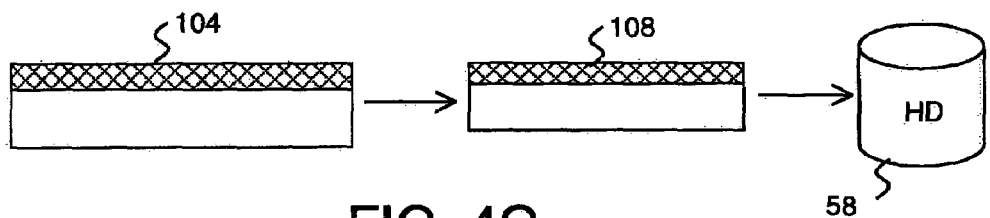

In step S16, a boolean test is performed. If all portions of image data 100 have been rasterized by the RIP algorithm, step S19 is performed. Otherwise, the next portion of image data is read (S18). In the example, the portion 104 is the next portion of image data to be transformed. It is written to the RAM 48 for applying the RIP algorithm to the portion 104. The size N4 of the portion 104 is such that N4 is equal to N or smaller than N, N being the size of the space allocated on the RAM 48 for storing image data. Then, as illustrated in FIG. 4C, the RIP algorithm, comprising the steps of halftoning and for example scaling, is applied to the portion 104. The transformed portion 108, consisting of halftoned and scaled image data, is written on the hard disk 58 of the controller 44. The boolean test (S16) is performed, and since the portion 104 is the last image data portion of the image data 100, the program goes to the next step (S19).

In step S19, the portions of rasterized image data are assembled for obtaining a rasterized image data representing the image to be printed. Here, in the example of FIG. 4A, it means that the portions 106 and 108 are merged, for obtaining the rasterized image data 109 shown in FIG. 4D.

In the part of the program that follows, the steps of dividing the rasterized image data into blocks, reading blocks of rasterized image data, transforming the blocks of rasterized image data into blocks of processed image data and transferring the blocks of processed image data to the print engine 2 for printing are executed by the CPU 50. Examples of transformations performed on the rasterized data blocks are rotation and/or mirroring. Other transformations are possible such as cropping, applying logical functions (e.g. ANDing, ORing), repeating parts of the image, etc.

Figure 4D:
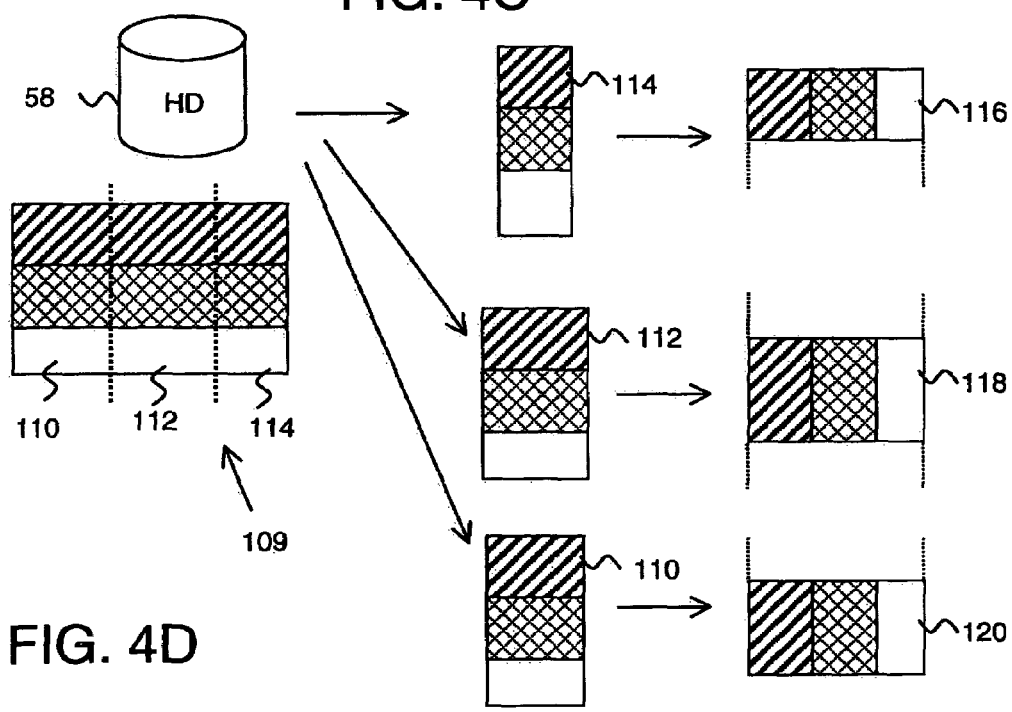

In step S20, the rasterized image data 109 (i.e. the merger of portions 106 and 108) is divided into three blocks 110, 112, 114, as shown in FIG. 4D. In the print job, a rotation of 90 degrees counter-clockwise to be applied to the image data is defined. The algorithm of the program is able to anticipate that the first block of data to be printed out by the print engine 2 is the block 114, once rotated. For efficiency reasons, the first block of rasterized data that is read is thus 114 (see FIG. 4D). A rotation algorithm is applied to the block 114 (S24), according to well-known rotation techniques. The processed (rotated) block 116 is transferred (S26) to the print engine 2. There, the block 116 can be written on a buffer memory of the print engine 2, and the control unit 64 of the print engine sends signals in accordance with print data to the printhead 34 for printing the processed block 116. The printhead 34 then starts printing (S28) swaths of the image.

Concurrently, the boolean test S30 is performed to determine if the last block of processed (rotated) data is being printed. If it is the case, the program can be ended (S34). In the example, the steps of reading the next block of rasterized image data (S32), rotating the block of rasterized image data (S24) transferring the block of rotated data to the print engine (S26) and printing the block (S28) have to be repeated for the blocks of rasterized image data 112 and 110, being respectively transformed by the rotation algorithm into the blocks 118 and 120. Finally, all processed (rotated) blocks are printed, according to the sequence of the blocks 116, 118 and 120, due to the type of the rotation.

The controller 44 of the print server 26 is an embodiment apparatus for processing image data stored on a memory for rendering an image on a device according to the invention. It is provided with the RAM 48 and the mass memory 58. The module for dividing the image data into a number of portions of image data can be in the form of instructions coded in one or more programs executable by the CPU 50, the program(s) being stored on the hard disk 58. The raster image processor unit can also be provided in the form of a sequence of computer-executable instructions. The same holds for the other modules of the controller 44: a module for assembling the portions of rasterized image data on the mass memory for obtaining rasterized image data, a module for dividing the rasterized image data into a number of blocks, and a conversion module for transforming each block of rasterized image data into a block of processed (e.g., rotated) image data.

Although the invention has been explained by reference to the above-described exemplified embodiment(s), it is not limited thereto. It will be clear to the skilled person that other embodiments are possible within the scope of the claims.

I claim:

1. A method of processing an image having a file size larger than RAM space allocated for storing image data on a device, the method comprising:
   dividing the image data into a number of portions of image data, each portion consisting of a number of untruncated data lines;
   applying to each said portion of image data a rasterizing algorithm comprising:
   a. writing said portion of image data to a RAM;
   b. halftoning said portion of said image data for obtaining a portion of rasterized image data, and
   c. writing the portion of rasterized image data to a mass memory;
   assembling the portions of rasterized image data on the mass memory for obtaining rasterized image data;
   dividing the rasterized image data into a number of blocks; and
   applying a transformation algorithm to each block of rasterized image data for obtaining blocks of processed image data.

2. The method of processing image data according to claim 1, wherein the rasterizing algorithm further comprises scaling the portion of image data.

3. The method of processing image data according to claim 1, wherein image data compression is applied to each portion of rasterized image data.

4. The method of processing image data according to claim 1, wherein the transformation algorithm comprises a rotation operation applied to the block of rasterized image data.

5. The method of processing image data according to claim 1, wherein the transformation algorithm comprises a symmetry operation applied to the block of rasterized image data.

6. The method of processing image data according to claim 1, wherein the blocks of rasterized image data are successively read out of the memory, transformed into blocks of processed image data and transferred to the device according to a sequence being the same as the sequence in which the blocks of processed image data are to be rendered on the device.

7. An apparatus for processing an image having a file size larger than RAM space allocated for storing image data, the apparatus comprising:
   a RAM;
   a mass memory;
   a module for dividing the image data into a number of blocks of image data, each block consisting of a number of untruncated data lines;
   a raster image processor unit for applying a rasterization algorithm to each block of said image data, and executing the steps of:
   a. writing a portion of said image data to the RAM,
   b. halftoning said portion of said image data for obtaining a portion of rasterized image data, and
   c. writing the portion of rasterized image data to the mass memory;
   a module for assembling the portions of rasterized image data on the mass memory for obtaining rasterized image data;
   a module for dividing the rasterized image data into a number of blocks; and
   a conversion module for transforming each block of rasterized image data into a block of processed image data.

8. The apparatus for processing image data according to claim 7, further comprising: a module for transferring the blocks of processed image data to a print engine.

9. The apparatus for processing image data according to claim 7, further comprising: a module for transferring the blocks of processed image data to a display device.

10. A computer program product residing on a computer readable medium comprising instructions for causing at least one process unit to perform a method of processing an image having a file size larger than RAM space allocated for storing image data on a device, comprising:
    dividing the image data into a number of portions of image data, each portion consisting of a number of untruncated data lines;
    applying to each portion of said image data a rasterizing algorithm comprising:
    a. writing the portion of said image data to a RAM,
    b. halftoning said portion of said image data for obtaining a portion of rasterized image data, and
    c. writing the portion of rasterized image data to a mass memory;
    assembling the portions of rasterized image data on the mass memory for obtaining rasterized image data;
    dividing the rasterized image data into a number of blocks; and
    applying a transformation algorithm to each block of rasterized image data for obtaining blocks of processed image data.

11. The computer program product according to claim 10, wherein the rasterizing algorithm further comprises scaling the portion of image data.

12. The computer program product according to claim 10, wherein image data compression is applied to each portion of rasterized image data.

13. The computer program product according to claim 10, wherein the transformation algorithm comprises a rotation operation applied to the block of rasterized image data.

14. The computer program product according to claim 10, wherein the transformation algorithm comprises a symmetry operation applied to the block of rasterized image data.

15. The computer program product according to claim 10, wherein the blocks of rasterized image data are successively read out of the memory, transformed into blocks of processed image data and transferred to the device according to a sequence being the same as the sequence in which the blocks of processed image data are to be rendered on the device.

* * * * *